United States Patent
Varoglu et al.

(10) Patent No.: US 9,976,860 B2
(45) Date of Patent: May 22, 2018

(54) SEAMLESS TRANSITION FROM OUTDOOR TO INDOOR MAPPING

(71) Applicant: Apple Inc., Cupertino, CA (US)

(72) Inventors: Devrim Varoglu, Santa Clara, CA (US); Monika Bansal, Sunnyvale, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 14/251,142

(22) Filed: Apr. 11, 2014

(65) Prior Publication Data
US 2014/0309924 A1    Oct. 16, 2014

Related U.S. Application Data

(60) Provisional application No. 61/812,533, filed on Apr. 16, 2013.

(51) Int. Cl.
*G01C 21/20*    (2006.01)

(52) U.S. Cl.
CPC .................. *G01C 21/206* (2013.01)

(58) Field of Classification Search
CPC ............................ G01C 21/206; G01C 21/367
USPC ........................................ 701/410, 457, 533
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,692,688 B1 * | 4/2014 | Tuxen ................... | B60Q 9/002 340/425.5 |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |

(Continued)

*Primary Examiner* — Aaron L Troost
*Assistant Examiner* — Paula L Schneider
(74) *Attorney, Agent, or Firm* — Fish & Richardson P.C.

(57) ABSTRACT

Techniques are described for seamlessly transitioning from a map that displays out-of-doors elements to a map that displays indoor elements, in response to detecting a transition event. The transition event may be, for example, that a navigation system that is generating the out-of-doors map has moved to an indoors location. Techniques are also provided for navigating to a parking spot in a parking structure. Specifically, users may search for parking spots that satisfy specific criteria. The search for a parking spot that satisfies the criteria may be initiated at the time a trip begins, or may be automatically triggered by some event. For example, a search for available parking spots near a designated destination may be automatically initiated as a user comes within a predetermined distance of the designated destination.

21 Claims, 5 Drawing Sheets

(56) References Cited

U.S. PATENT DOCUMENTS

| | | | |
|---|---|---|---|
| 2006/0253226 A1* | 11/2006 | Mendelson | G08G 1/14 701/1 |
| 2007/0001904 A1* | 1/2007 | Mendelson | G01C 21/206 342/450 |
| 2011/0172906 A1* | 7/2011 | Das | G01C 21/20 701/533 |
| 2011/0251787 A1 | 10/2011 | Gupta et al. | |
| 2012/0064855 A1 | 3/2012 | Mendelson | |
| 2013/0035110 A1* | 2/2013 | Sridhara | H04W 4/021 455/456.1 |
| 2013/0144525 A1* | 6/2013 | Yang | G01C 21/206 701/533 |
| 2014/0062724 A1 | 3/2014 | Varoglu et al. | |
| 2014/0066091 A1 | 3/2014 | Varoglu et al. | |
| 2014/0088860 A1* | 3/2014 | Poornachandran | G01C 21/16 701/410 |
| 2014/0114568 A1* | 4/2014 | Park | G01S 5/0263 701/469 |
| 2014/0176349 A1* | 6/2014 | Smullin | G08G 1/142 340/932.2 |
| 2014/0229109 A1* | 8/2014 | Gupta | G01C 21/20 701/537 |
| 2014/0253538 A1* | 9/2014 | Bailiang | G06T 15/08 345/419 |

* cited by examiner

SEAMLESS TRANSITION FROM OUTDOOR TO INDOOR MAPPING

CROSS-REFERENCE TO RELATED APPLICATIONS; BENEFIT CLAIM

This application claims the benefit of Provisional Appln. 61/812,533, filed Apr. 16, 2013, the entire contents of which is hereby incorporated by reference as if fully set forth herein, under 35 U.S.C. § 119(e).

FIELD OF THE INVENTION

The present invention relates to mapping systems and, more specifically, to transitioning from outdoor to indoor mapping.

BACKGROUND

Many navigation systems are available to help users navigate from one location to another. When using such systems, the destination is typically identified by GPS coordinates. However, most users do not think of locations in terms of GPS coordinates, so additional mechanisms are provided for designating destinations. For example, many systems provide a mechanism that allows users to identify a destination based on the name of the destination (e.g. "Sears"), the category to which the destination belongs (e.g. "Restaurants"), the street address of the destination, cross-streets near the destination, etc. When a user designates a destination in one of these manners, the navigation system typically performs a look-up operation to determine the GPS coordinates of the specified destination. Once the destination's GPS coordinates have been determined, the navigation system helps the user navigate to the destination.

Navigation systems may help users navigate to a selected destination in a variety of ways. One common way to help users navigate to a selected destination is to display a map of the user's current location, along with (a) an indication of the user's current position on the map, and (b) an indication of a route, from the user's current position, to the selected designation. The route indication may indicate the entire route, or a small portion of the route starting from the user's current position.

Typically, as the user moves, the display of a navigation system is updated to reflect the new position of the user relative to the displayed map. To avoid the user's position indicator from leaving the display, the display may be repeatedly updated with new map information. For example, as a user travels north, the displayed map may scroll down so that new map information is revealed at the top of the display, old map information scrolls off the bottom of the display, and the user's current position indicator remains approximately at the center of the display.

Such visual navigation aides are often accompanied by audible aides. For example, in addition to highlighting a suggested route on the displayed map, the navigation system may audibly tell the user when to turn, which direction to turn, the name of the street on which to turn, etc. Sophisticated navigation systems may also indicate things such as the user's speed, the current heading, the current weather at the destination, the current speed limit, traffic conditions along the proposed route, alternative routes, points of interest along the route, etc.

As long as navigation systems are able to receive accurate GPS signals, the systems work remarkably well in navigating users to the GPS coordinates associated with their designated destination. However, things start to break down in situations where GPS signals cannot be reliably received. Unfortunately, GPS signals can rarely be reliably received when something blocks the navigation system from the open sky. Navigation systems are blocked from the open sky in a variety of circumstances, including but not limited to dense tree cover, tall buildings, tunnels, covered parking structures, and most indoor environments.

Consequently, within navigation systems, most destinations are associated with GPS coordinates that are outdoors, even though the actual destinations are indoors. For example, the GPS coordinates for a store within a mall may actually correspond to location on the street in front of the mall. Similarly, the GPS coordinates for a covered parking structure may actually correspond to the street entrance to the parking structure, rather than any specific location within the parking structure.

Unfortunately, the outdoor GPS location associated with a destination is often not where the user actually needs to go. For example, a user that wants to visit a particular store in a mall may actually need to first find a parking spot in a covered parking structure near the mall, and then need to find the store within the mall itself. Conventional navigation systems may simply lead such a user to the outdoor GPS location associated with the mall, and then leave the user to fend for his/herself in finding a parking spot and the desired store. Often, the tasks of finding a suitable, available parking spot, and then the specific store in question, may involve a lot of wandering, frustration, and wasted time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for seamlessly transitioning from outdoor mapping to indoor mapping. In one embodiment, the techniques involve detecting a current location of a computing device that is associated with a display. The computing device may be, for example, a mobile device executing navigation software, a navigation system that is built into a vehicle, a special-purpose mobile GPS device, or any other navigation system.

Based on the current location of the computing device, the display depicts a first map of out-of-doors elements in the vicinity of the current location of computing device. The technique further involves detecting that the current position of the computing device has transitioned to an indoors location. In response to detecting that the current position of the computing device has transitioned to an indoors location, the display depicts a second map of indoors elements in the vicinity of the current location of the computing device.

Detecting that the current position of the computing device has transitioned may involve, for example, detecting that a GPS signal by which the current location of the computing device is determined has become weak or lost, or detecting that the computing device has begun to receive a wireless signal from at least one stationary transmitter.

In one usage scenario, the indoors location is a parking structure, and the second map illustrates individual parking spots within the parking structure. In addition, the second map may actually indicate that a particular parking spot within the parking structure is currently available, and the computing device may communicate directions from the current location to the particular parking spot.

According to another aspect, the techniques involve receiving, at a computing device, input that indicates an intended destination. Rather than simply navigate the user to the outdoor GPS coordinates associated with the destination, a plurality of parking spots, which belong to one or more parking structures at or near the intended destination, are filtered based on one or more characteristics of the parking spots to produce a filtered set of parking spots. The computing device then provides directions from a current location of the computing device to a particular parking spot from the filtered set of parking spots.

In such an embodiment, the intended destination may or may not be a particular parking structure. When the intended destination is not a parking structure, a search based on the location of the intended destination may be automatically performed to identify the one or more parking structures.

The one or more characteristics may include, for example, current availability of the parking spots or size of the parking spots.

The search for parking structures may be performed automatically in response to an event that indicates that the computing device is approaching the intended destination. Similarly, the filtering of the parking spots may be performed in response to an event that indicates that the computing device is approaching the intended destination.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for seamlessly transitioning from a map that displays out-of-doors elements to a map that displays indoor elements, in response to detecting a transition event. The transition event may be, for example, that a navigation system that is generating the out-of-doors map has moved to an indoors location. The transition event may be detected in a variety of ways, many of which shall be described in detail hereafter.

Techniques are also provided for navigating to a parking spot in a parking structure. Specifically, users may search for parking spots that satisfy specific criteria, such as: non-handicapped parking, large enough for a mid-size car, in the vicinity of a particular address, costing less than $10 per day, that is currently available. The search for a parking spot that satisfies the criteria may be initiated at the time a trip begins, or may be automatically triggered by some event. For example, a search for available parking spots near a designated destination may be automatically initiated as a user comes within a predetermined distance of the designated destination.

The Navigation System

As used herein, the term "navigation system" refers to any set of one or more computing devices used to assist a user in navigation. Examples of navigation systems include, but are not limited to, personal data assistants, mobile phones, tablets, laptops or any other phone or general-purpose computing device that is executing navigation software. In addition general-purpose computing devices, some navigation systems have special-purpose navigation components. Navigation systems with special-purpose components may include navigation equipment that is built into vehicles, mobile GPS devices, etc.

Navigation systems typically include at least one component capable of receiving wireless signals from which the current position of the component may be derived. Often, the signals from which navigation systems derive their current position are GPS signals. However, the current location of a navigation system may be derived from other types of wireless signals. Information from such other signals may be used by the navigation instead of, or in conjunction with, GPS signals to determine the current location of the navigation system. The component that receives the wireless signals may be attached to, or separate from, the other components of the navigation system. In some embodiments, one or more components of the navigation system may be executed on a server that is remote to the component that receives the wireless signals. Thus, the "current position" determined by the navigation system is typically the position of the signal-receiving component, and not necessarily the position of all components of the navigation system.

Transitioning from Outdoor to Indoor Maps

As mentioned above, techniques are provided that allow a navigation system to switch from a map that displays out-of-doors elements to a map that displays indoor elements in response to detecting a transition event. Any one of a variety of events may trigger such outdoor-to-indoor map transitions. In general, the transition event may be any event that (a) is detectable by the navigation system, and (b) indicates that the navigation system, or a component thereof, has moved to a position that is indoors.

For example, possible transition events include, but are not limited to:

The GPS signal indicates a position that is within or very close to the geographic coordinates of a known indoor structure, such as a covered parking structure.

For more than a threshold amount of time, the position of the navigation system is within the geographic coordinates of a known indoor structure.

The GPS signal is associated with a margin of error that exceeds a certain threshold, and the last known accurate GPS position was within or very close to the geographic coordinates of a known indoor structure.

A GPS signal is lost, and the last known GPS position was within or very close to the geographic coordinates of a known indoor structure.

A signal from an indoor stationary transmitter is received.

Signals from multiple stationary transmitters are received, where the signals indicate that the navigation system, or a component thereof, is heading in the direction of or already within an indoor structure.

In the case where a GPS signal indicates a position within an indoor structure, the navigation system may be able to receive the GPS signal, even though indoors, if the GPS signal is able to bounce off surfaces to reach the indoor location of the navigation system. In the case where the GPS signal is lost completely or has a very high margin of error, it may be assumed that the user entered an indoor environment in which even bounced GPS signals do not provide sufficient accuracy.

These are merely examples of events that may trigger the transition of a navigation system from the display of a map with out-of-door elements, such as a street map, to display of a map with indoor elements, such as the map of a parking structure or the stores within a mall.

Several of these examples involve the use of stationary transmitters. The use of stationary transmitters in both transitioning from outdoors to indoors maps, and navigating once indoors, shall be described in greater detail below.

Stationary Transmitters

As used herein, a stationary transmitter is any stationary device that sends a wireless signal that can be received by the navigation system when the navigation system, or a component thereof, is within the vicinity of the device. The signal may be sent using any one a multitude of wireless technologies, including but not limited to Asymmetric Wireless Data Link (AWDL) and Bluetooth Low Energy (BT LE). An example of a stationary transmitter, which may be used in conjunction with the techniques described herein, is described in U.S. patent application Ser. No. 13/605,747, filed Sep. 6, 2012, and U.S. patent application Ser. No. 13/605,245, filed Sep. 6, 2012, the contents of both of which are hereby incorporated herein for all purposes.

The content of the signal sent by a stationary transmitter will vary from implementation to implementation, but generally will provide sufficient information to allow the navigation system to determine the navigation system's general location. For example, in one embodiment, a stationary transmitter may merely send a unique identifier. Based on the unique identifier, the navigation system may perform a look up to determine the coordinates of the stationary transmitter. From the coordinates of the stationary transmitter, the navigation system may estimate its own location.

In other embodiments, the content of the signal from the stationary transmitter may be much richer in information. For example, the signal may indicate the geographic coordinates of the stationary transmitter and even contain information about the structure in which the transmitter resides. For example, if the stationary transmitter resides in a parking structure, the signal may contain a map of the parking structure, an indication of the level on which the transmitter resides, an indication of which parking spots are currently available, and data that indicates the characteristics of each parking spot (e.g. whether handicapped, compact only, usage cost, etc.).

When multiple stationary transmitters are within communication range of the navigation system, triangulation may be used in conjunction with the signals to more precisely determine the current position of the navigation system. Based on the strength of signals of two stationary transmitters, for example, it is possible to accurately determine whether the current heading of a navigation system is toward, or away from, an indoor structure. As mentioned above, a heading that is into an indoor structure may be one of the conditions that trigger an outdoor-to-indoor transition event to occur.

The stationary transmitters used for indoor navigation of a particular structure need not be in the structure itself, as long as their signals are sufficiently strong to be received while in the structure. Thus, a stationary sensor located in the vicinity of several indoor structures may be used to navigate, and provide maps and supplemental information, for all of those indoor structures. The specific maps and supplemental information provided to a given user is based on the indoor structure in which the user resides, as determined at least in part based on the signal provided by the stationary transmitter.

Obtaining the Indoor Maps

The indoor maps that are displayed by the navigation system in response to detecting an outdoor-to-indoor transition event may be obtained by the navigation system in a variety of ways. For example, in one embodiment, the navigation system obtains indoor maps in the same manner that it obtains outdoor maps. Thus, just as a navigation system may have information about outdoor elements (e.g. street maps) pre-loaded onto its internal storage, the navigation system may have indoor maps pre-loaded onto its internal storage.

However, pre-loading indoor maps of all structures in a large region, such as North America, may consume more storage than is desirable. Therefore, in alternative embodiments, indoor maps may be loaded on an as-needed basis in response to a map-loading event. Various types of map-loading events may trigger the loading of the map of an indoor structure, and the techniques described herein are not limited to any particular map-loading event.

For example, in one embodiment, the selection of a particular destination using the navigation system may trigger the navigation system to download indoor maps of structures at or near the selected destination. As another example, the same event that triggers the outdoor-to-indoor transition may trigger the downloading of an indoor map of the structure that is at or near the current location.

The source from which the indoor map is obtained may also vary from implementation to implementation. For example, in one embodiment, the navigation system is connected wirelessly to a larger network, such as the Internet, by one of the many available wireless technologies (e.g. cellular, 3G, 4G, etc.) In such an embodiment, the navigation system may obtain the indoor map from a service over that network. The navigation system may obtain all of its indoor maps from the same map-providing service, or may obtain different indoor maps from different services. For example, the signal from a stationary device may identify a particular service (for example, by providing a specific URL), and the navigation system may send a request for an indoor map to that particular service.

Instead of, or in addition to, obtaining indoor maps from services provided over a large network, navigation systems may obtain maps from stationary transmitters themselves, or from a service on a local wireless network in the vicinity of the stationary transmitters.

To avoid wasting storage within the navigation system, the navigation system may be configured to discard/overwrite downloaded indoor maps when they are no longer needed. The policy of when to discard/overwrite an indoor map may vary from implementation to implementation. For example, in one embodiment, an indoor map is discarded when the navigation device is more than a threshold distance from the location of the structure that corresponds to the map. Thus, the map of a parking structure may be discarded when the current location of the navigation system is more than a mile from the parking structure. As another example, the map of a parking structure may be discarded when the navigation system has been outside the parking structure for more than ten minutes.

Supplemental Information

As mentioned above, in addition to the indoor maps themselves, the navigation system may obtain supplemental information about indoor structures. The supplemental information may vary widely based on the nature of the corresponding indoor structure. For example, if the indoor structure is a mall, the supplemental information may include the coordinates of each store, the name of each store, special sales currently going on at each store, discount coupons, the shows and showtimes of a theater in the mall, menus of restaurants in the mall, etc.

On the other hand, if the indoor structure is a parking structure, the supplemental information may be the coordinates of each parking spot, the characteristics of each parking spot (size, restrictions, usage costs, etc.), and whether the parking spot is currently available. The current availability information may be obtained, for example, by placing sensors in each parking spot. Such "availability sensors" may be based on visual information (e.g. whether a vehicle is breaking a beam of light projected across the parking spot), or other information (e.g. weight sensors, metal detectors, etc.).

Rather than maintain availability on a per-spot basis, availability may be maintained on a per-aisle basis. For example, light beams may be arranged to detect when vehicles have entered a particular aisle, and when vehicles leave the particular aisle. The amount of vehicles currently parked in the aisle may be estimated to be the number of vehicles that have entered the aisle minus the number of vehicles that have left the aisle. In structures where availability is maintained on a per-aisle basis, the supplemental information provided to the navigation system may include the per-aisle availability of parking spots.

Because some supplemental information (e.g. the availability of parking spots) will change frequently, the navigation system may be configured to repeatedly request updates to such supplemental information and/or defer requesting such supplemental information until the navigation system is within a predetermined distance of the parking structure. For example, the availability of parking spots within a parking structure may be requested by the navigation system in response to the navigation system reaching a location that is within five minutes of the parking structure.

According to one embodiment, the display of the indoor structure may be modified to reflect the supplemental information. For example, on the map of a parking structure, available spots may be displayed as blinking, taken spots may be displayed as black, and handicap spots may be displayed as blue. As another example, the map of a mall may be displayed where different types of stores have different colors, stores with specials are blinking, and stores for which coupons are available have a star. These are merely examples of the virtually unlimited number of ways indoor maps may be modified based on the supplemental information.

According to one embodiment, the supplemental information may include routing information to an available parking spot. In such an embodiment, the destination parking spot is selected by the computing system associated with the parking structure itself, rather than the user of the navigation system.

In yet another embodiment, the supplemental information may be tailored to the specific user of the navigation system. For example, the navigation system may send a message that identifies the user to the computer system associated with the structure. Based on the identity of the user, the computer system associated with the structure may send customized supplemental information. For example, assume that a user X has entered a particular parking structure, and that the computer system of the parking structure has a profile associated with user X. Assume further that the profile of user X indicates that user X has an annual parking pass, and drives a large-sized car. Based on that information, the parking structure's computer system may send to the navigation system of user X routing information that routes user X to the nearest unoccupied full-sized annual-user parking spot.

In one embodiment, when the indoor structure is a mall, the user-specific supplemental information may indicate which stores in the mall are stores for which the user has gift cards, which stores in the mall are stores frequently visited by the user, which stores in the mall are associated with credit cards owned by the user (e.g. Sears may be highlighted if the user has a Sears MasterCard), etc. Such stores may be highlighted on the indoor map displayed to the user.

As another example, the navigation may not identify the user, but merely the size of the vehicle in which the navigation system resides. Under these circumstances, the parking structure's computer system may send a map in which all unoccupied parking spots, of the size that matches the vehicles size, are highlighted.

In situations where the indoor structure is a parking structure and the parking spots are paid spots for specific durations, the supplemental information may include the time remaining for the user's paid parking. For example, assume that at 2:00 pm a user parks in a particular spot, and pays for 1 hour of parking. In such a situation, the supplemental information sent to the user's navigation system may include the location of the parking spot and the deadline of 3:00 pm. Based on this information, the navigation system may generate an alert when the time approaches 3:00 pm. According to one embodiment, the timing of the alert may be based both on the deadline, and the distance between the location of the parking spot and the current location of the navigation system. That is, the further away the user is from the parking spot, the sooner the alert to return to the parking spot may be generated.

In situations that involve paid parking, the navigation system may include a mechanism by which the user can extend the parking deadline. For example, the navigation system may interact with a payment application to pay for additional time. In such an embodiment, the supplemental information received by the navigation system may include an identifier that uniquely identifies the parking spot in which the user parked, and that identifier may be passed to the payment application to identify the parking spot for which additional time is being purchased.

Indoors Navigation

According to one embodiment, the navigation system not only displays an indoor map when the navigation system has travelled to an indoors location, but continues to provide navigation assistance to the user. For example, the indoor map may include a current-position indicator that indicates the current position of the user, and a suggested-route indication that indicates to the user how to get from the current position to the desired indoor destination. Similar to outdoor navigation aids, the indoor navigation aids may also include audible directions about where and in which direction the user should turn.

In situations where the indoor structure involves multiple levels, various mechanisms may be used by the navigation system to determine which level the user is currently on. For example, the navigation may determine the user's level based on an altitude indication from a GPS or other signal. Instead of, or in addition to the altitude signal, the navigation system may determine the level on which the user resides based on signals from other sources, such as level-indicating stationary transmitters. The level-indicating stationary transmitters may be the same or different from the coordinate-indicating stationary transmitters, and may use the same or a different wireless technology to communicate with the navigation system.

When the navigation system determines that the user has moved to a different level, the indoor map associated with the previous level is replaced with the map of the current level. The map of the current level is then annotated with navigation aids, such as the current-position indicator and a route suggestion.

When an indoors structure includes multiple levels, various rules may govern when the maps of the different levels are sent to the navigation system. For example, when a user first enters a parking structure, only the map of the first level of the parking structure may be sent to the navigation system. The map of the second level may be pushed to the navigation system if and only if the user approaches a sensor associated with the second level. Similarly, the map of the third level may be pushed to the navigation system if and only if the user approaches a sensor associated with the third level.

Alternatively, the map of all levels of the parking structure may be pushed to the navigation system when the user initially enters the parking structure. As yet another alternative, maps of the first two levels may be pushed to the navigation system when the user initially enters the parking structure, and the map of the third level is pushed to the navigation system if and only if the user approaches a sensor associated with the second level.

Return-to-Vehicle Navigation

According to one embodiment, a record is stored of the particular parking spot to which a particular user navigated. The record may be stored by the navigation system itself, or by the computer system of the parking structure. In the case where the user selected the specific parking spot (as opposed to the parking structure routing the user to a particular spot) the navigation system may communicate the selected spot to the parking structure computer system.

Once a record of the particular parking spot is stored, the information in the record may be used to assist the user to return to the vehicle. For example, a user may select a "return to vehicle" option in the navigation system. In response, the navigation system may obtain the record and determine a route from the user's current location to the vehicle. Alternatively, the route may be determined by the parking structure's computer system. The navigation system may display the appropriate indoor map, as well as a route indicator from the user's current position to the parking spot to which the user was previously routed. As with all other indoors navigation, during the return-to-vehicle navigation, the navigation system may rely on signals from stationary transmitters instead of or in addition to GPS signals, to determine the user's current location, level within the structure, and heading.

Searching for Indoor Elements

In various embodiments, searchable-information about indoor structures, and indoor elements within indoor structures, is made available to the navigation system at the time the user is selecting a destination. Similar to the supplemental information discussed above, the searchable-information about the indoor elements may vary based on the nature of the indoor structure. For example, for parking structures, the searchable-information may include the number of parking spots, and characteristics of each of the parking spots. With respect to parking spots, the characteristics included in the searchable information may include, but are not limited to:
  Preferred/Lastly parked spots (e.g. the spot a user parked in the last time the user went to a particular mall)
  Time based spots (e.g. indicate to the user the time of the day when the mall will have 10% or more parking spots open so that the user will not have to roam much to find one)
  Price based spots/lots (e.g. show the user the map of downtown for last month with price tags wherever the user paid for the lot, and suggest lots in ascending order of prices, distance, etc.)
  Filter based spots (show the user only those spots which are available for more than 2 hours, or which are available during 9 am to 6 pm peak time.
  Size based spots (e.g. suggest only those spots that can fit in full-size cars, etc.)
  Digital/credit card based spots (e.g. show only those spots/lots that could be remotely renewed in case the user exceeds the car park time)
  Connectivity based spots (e.g. do not show any underground based parking lots)
  On the other hand, for a mall, the searchable-information may include, but is not limited to:
  The names and locations of stores.
  The hours in which the stores are open.
  Preferred/Lastly visited stores.
  Stores for which the user has gift cards.
  Stores to which the user has a membership.
  Stores for which discount coupons are available.
  Stores currently having a store-wide sale.
  By making the searchable-information available to the navigation systems at the time a destination is chosen, the user may select a specific indoor element as the destination. For example, in one embodiment, the user may initially provide an address as the destination. In response to determining that the address is for a mall, the navigation system may download searchable-information for the stores within the mall. The user may then search for stores having a store-wide sale. When presented with the search results, the user may then select one of the listed stores as the actual destination. Based on the selection of a particular store, the navigation system may navigate the user to the mall using an outdoor map of the streets, and then through a parking structure of the mall using an indoor map, and then through the mall itself to the selected store based on yet another indoor map. In the present example, within the parking structure, the navigation system may navigate the user to the parking spots near the mall entrance that is closest to the selected store.

In the example given above, the user selected a particular mall before searching for stores based on store-specific information. In an alternative embodiment, a user may search for indoor elements (such as stores) without first limiting the search to a particular indoor structure. For example, a user may pick a particular city, and then search for all stores in the city that satisfy certain store-specific criteria (e.g. currently-open stores for which the user has gift cards). In response, the user may be presented with a list of matching stores from multiple malls. In response to selection of one of the stores, the navigation system may navigate the user to the mall to which it belongs, then to a parking spot near the entrance that is closest to the store, and then through the mall to the store itself.

As another example, a user may select, as the destination, an address that is near several parking structures. Upon detecting that the address is near several parking structures, the navigation system may ask the user whether the user desires to search for parking options. If the user desires to search for parking options, the navigation system may download searchable-information about the parking structures, including characteristics and availability of individual parking slots. The user may then search for parking slot, among the parking slots of all of the parking structures, that best suits the user's needs. For example, the user may indicate a preference for a free, compact-car parking spot within a certain distance of the destination. Based on these preferences, the navigation system may present the parking spots that satisfy the criteria to the user. Upon selecting one of the matching parking spots, the selected parking spot may become the new destination to which the navigation system navigates the user.

In an alternative embodiment, the user's parking preferences may be stored in a profile. In response to determining that the user has selected a destination that is near several parking structures, the navigation system may automatically download the searchable-information for the parking structures, automatically search for the parking spot that best matches the preferences specified in the user's profile, and automatically select the best matching parking spot as the new destination. Alternatively, the navigation system may not automatically change the destination, but may ask the user if the user wants the destination to be changed to the best matching parking spot.

Search-Triggering Events

In the examples given above, searches for specific indoor elements (e.g. parking spots or stores within a mall) are performed at the time a destination is selected. However, under some circumstances, it may be desirable to defer the performance of such searches. For example, if a user is more than an hour from an intended destination, the parking spots that are available at the time the user selects the destination may be very different than the parking spots that are available at the time the user reaches the destination. As another example, the stores that are currently-open may differ from the time a user selects a destination city that is several hours away, to the time when the user actually arrives in that city.

According to one embodiment, the search for specific indoor elements is triggered by some event that occurs after the user selects a destination. For example, the search for available parking spots near a destination may be triggered by the navigation system detecting that the destination is less than a mile away. As another example, the search for available parking spots may be triggered by a user selecting a "find parking spot" control as the user approaches the destination.

As another example, the search for a parking spot may be triggered in response to detecting the stationary transmitter of a selected destination. For example, a selected destination may be a parking structure that has one or more stationary transmitters. When the navigation system gets close enough to the destination, the navigation system will begin to receive the signal from the destination's stationary transmitters. In response to receiving the signal, the navigation system may automatically perform a search for available parking spots. In this example, the search may be performed by sending a query to the stationary transmitters themselves. In response, the destination may be automatically changed to a particular available parking spot, to which the navigation system directs the user. In this situation, the parking spot that is automatically selected may be selected based on both its availability, and any additional criteria (car size, level, etc.) that are stored in the user's profile preferences.

In some situations, an indoor element that matches the user's specified criteria may not be available at the time the search is performed. For example, a user may search for parking spots, within the vicinity of a particular destination, that are large enough for a truck. At the time the search is performed, there may not be any such spots available. According to one embodiment, under these situations, the search is automatically repeatedly performed as the user travels to the destination. When a parking spot that satisfies the criteria becomes available, the navigation system may prompt the user with information about the spot, and may ask whether the user desires to reserve the spot. In response to an indication that the user wants to reserve the spot, the navigation system establishes the spot (or the structure in which it resides) as the current destination, and communicates with the parking system service that the spot is to be reserved (which may involve paying for the reservation). The navigation system then navigates the user to the structure using an outdoor map, and then, upon arrival at the structure, to the specific parking spot using an indoor map.

At the time a parking spot matches the user's criteria, the other parking structures that were being queried may be told that the search has been satisfied, so they no longer need to continue to search for a parking spot for the user. Alternatively, the other parking structures may continue to look for a matching parking spot, although one has already been selected by the user. In response to another parking spot becoming available that matches the user's criteria, the user may be presented with information about the newly-available parking spot, and asked if the user wishes to switch the user's reservation to the new spot. In response to the user indicating a desire to switch to the newly-available spot, the navigation system communicates with the parking systems to cancel the old reservation, make the new reservation, and change the destination to the newly-available parking spot. On the other hand, if the user chooses not to change the reservation, the navigation system does not change the destination.

Estimated Time of Arrival

It is common for navigation system to display an estimated time of arrival at the destination selected by the user. In one embodiment, the navigation system takes into account the estimated arrival time when comparing certain element-specific attributes to search criteria. For example, in the case where a user is searching for all currently-open stores in a mall, the navigation system may compare the estimated time of arrival to the schedules of the stores, rather than the current time. Thus, a store that is an hour away, and opens at 10 am, will be treated as a currently-open store in a search performed at 9:30 am.

Outdoor-to-Indoor Map Transition Examples

Figure 1:
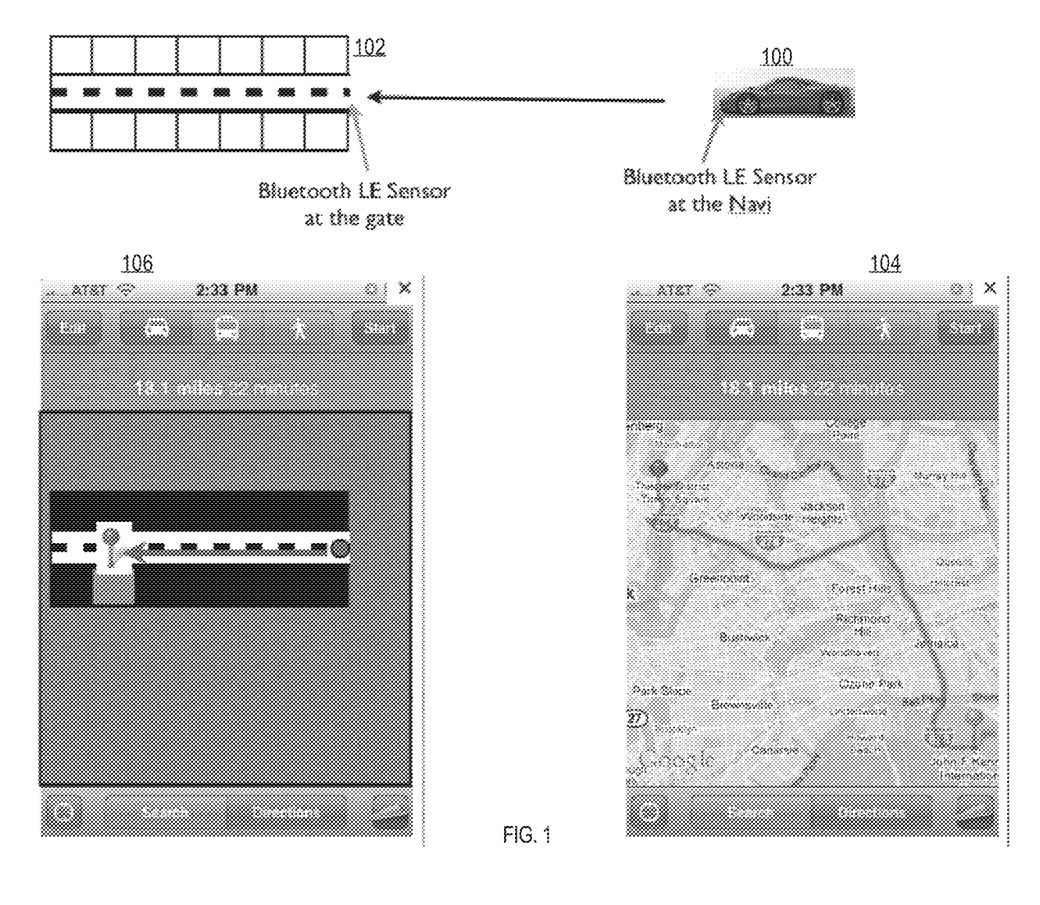
FIG. 1 is a block diagram illustrating transition from a street map to a map of a parking structure, according to an embodiment.

FIG. 1 is a diagram that illustrates how a navigation system may transition from a map containing outdoors elements to a map with indoors elements, according to one embodiment. As illustrated in FIG. 1, a navigation system may be used while travelling within a vehicle 100 to a specified destination. In the example illustrated in FIG. 1, the navigation system is operatively coupled to a Bluetooth LE sensor. Until a transition event occurs, the navigation system causes a map 104 showing outdoor elements to be displayed. In the illustrated example, the map is a street map which contains a present location indicator, a destination indicator, and a suggested route from the present location to the destination.

When the vehicle 100 gets close enough to the destination, the navigation system begins to receive a signal from a Bluetooth LE sensor located at the gate of a parking structure 102 associated with the destination. In response to detecting the signal from the sensor and/or a corresponding drop in the strength of the GPS signal received by the navigation system, the navigation system may automatically transition from map 104 to an indoor map 106 of the parking structure. Map 106 of the parking structure also includes a current location indicator, a destination indicator, and a suggested route indicator. As mentioned above, the destination identified in the indoor map 106 may be an automatically-selected parking spot that satisfies certain criteria. The criteria may be, for example, that the slot is currently available and large enough for vehicle 100.

While within the parking structure, the navigation system may determine the current location based on the signal from the stationary sensor, GPS signals, or both. After vehicle 100 is parked, the navigation system may be removed from the vehicle 100 as the user proceeds by foot into a mall. In response to detecting that the user has entered a mall, the navigation system may transition once again to an internal map of the mall, and display a route to the user's preferred or previously-selected store.

Figure 3:
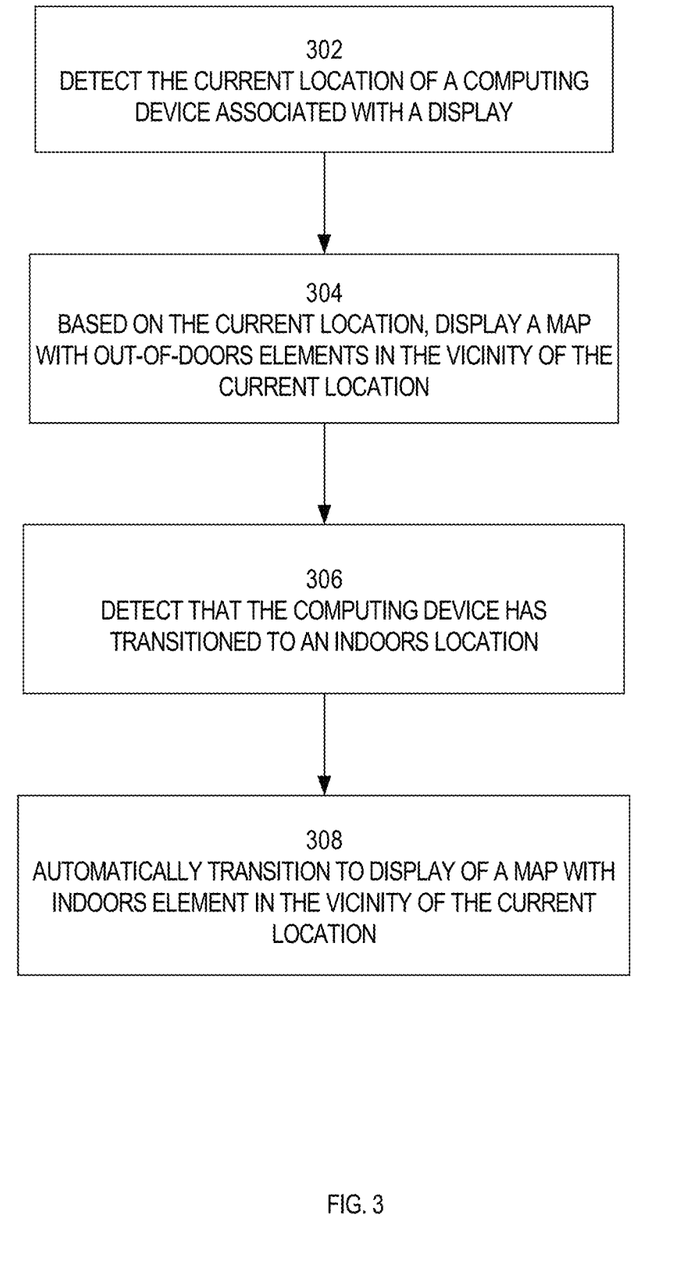
FIG. 3 is a flowchart illustrating steps for transitioning from outdoor to indoor maps, according to an embodiment.

FIG. 3 is a flowchart showing the general steps for seamlessly transitioning from outdoor to indoor maps, according to one embodiment. Referring to FIG. 3, in step 302, the current location of a computing device (e.g. a component of the navigation system) is detected. In step 304, a map with out-of-doors elements (e.g. a street map) in the vicinity of the current location is displayed. At step 306, it is detected that the computing device has transitioned to an indoor location. As explained above, an out-door-to-indoor transition may be detected based on the occurrence of any one of a number of possible transition events. At step 308, in response to the outdoor-to-indoor transition of the computing device, the display automatically transitions from display of the outdoors map to display of an indoors map.

Searching for Indoor Elements Example

Figure 2:
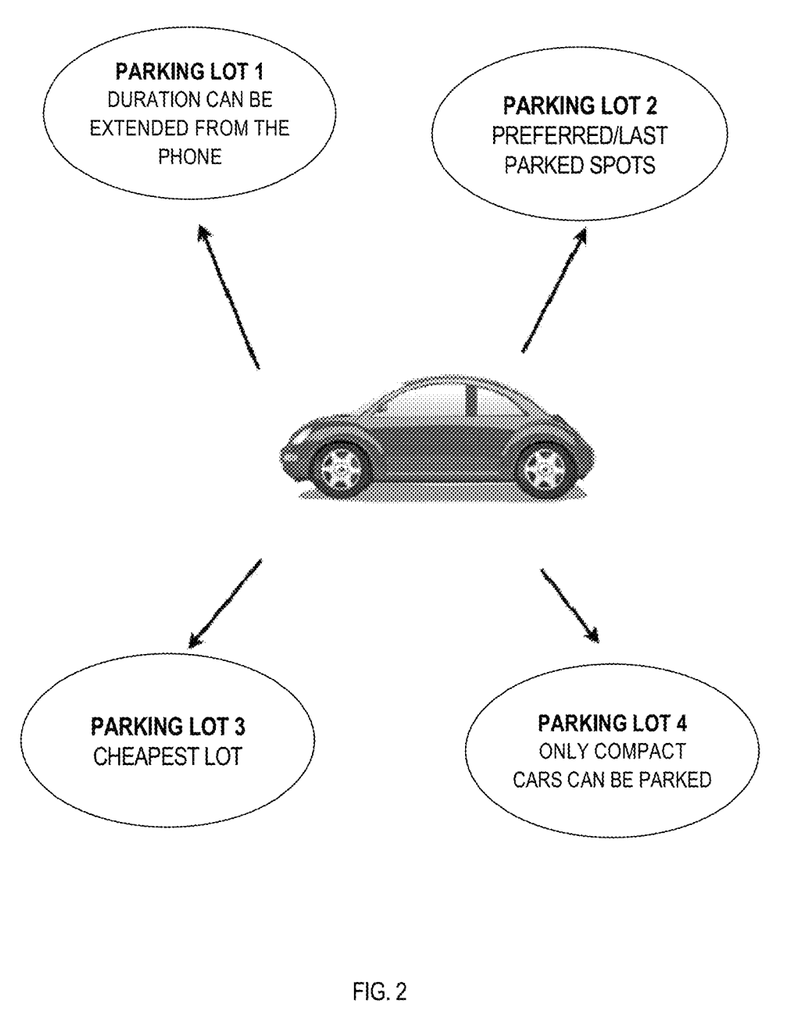
FIG. 2 is a diagram illustrating criteria by which users may search for parking spots, according to an embodiment.

As mentioned above, using the techniques described herein, it is possible to search for specific indoors elements, such as stores within a mall, seats within a stadium, and parking spots within a parking structure. FIG. 2 illustrates the situation in which the user of a vehicle may use a navigation system within the vehicle to locate and navigate to a parking spot based on specific criteria. Depending on the criteria specified, the user may be presented with different possible indoor destinations. For example, if the user searches for a parking spot whose duration can be extended by phone, the user may be presented with parking lot 1. If lot 1 is selected, then the user may be further presented with available parking spots within lot 1, as the user approaches the vicinity of lot 1.

On the other hand, if the selection criteria is preferred/last parked spots, cheapest spots, or compact-only spots, the search results may present lots 2, 3 or 4, respectively. As mentioned above, the search for specific spots may take at various different times. For example, the search may take place when the original destination is selected, when the vehicle comes within a predetermined distance of the destination, or upon occurrence of any other search-triggering event.

Figure 4:
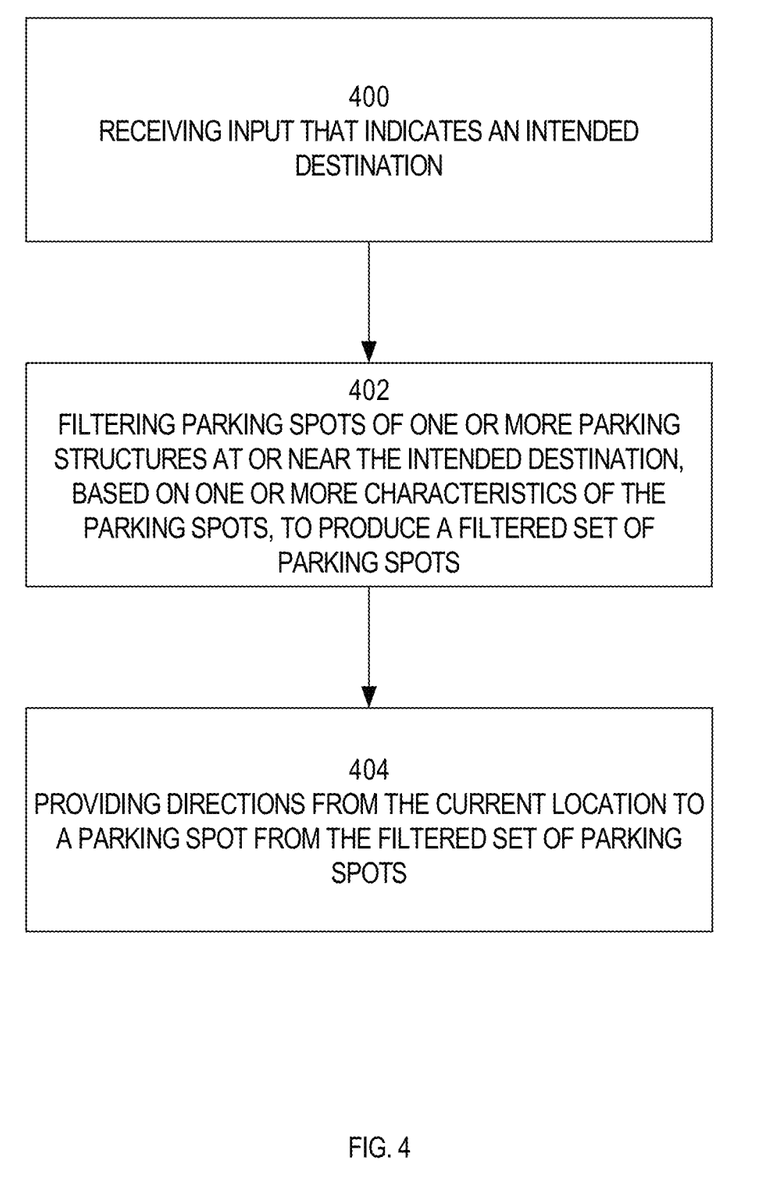
FIG. 4 is a flowchart illustrating steps for searching for a parking space using a navigation system, according to an embodiment.

FIG. 4 is a flowchart showing the general steps for searching for a parking spot according to an embodiment of the invention. At step 400, the navigation system receives input that indicates an intended destination. At step 402, parking spots of one or more parking structures at or near the intended destination are filtered based on one or more characteristics of the parking spots. As mentioned above, the filter criteria may include any number of characteristics, including current availability, ability to pay by mobile device, size, etc. After the parking spots that satisfy the criteria are identified, one of the spots may be selected automatically, or by the user. Then, at step 404, the navigation system provides direction from the current location to the selected parking spot.

As mentioned above, parking spots are merely one example of a type of indoor element for which a user may search using the navigation system. Other examples include, but are not limited to, stores within a mall, seats within a stadium, booths within a convention, gates within an airport, etc.

Alternatives and Enhancements

For the purpose of explanation, the techniques described herein have been described using examples of parking structures and malls. However, the techniques may be used in conjunction with any indoor environment that is large enough that navigational assistance is useful. For example, the techniques may be used in conjunction with airports to help users navigate to the appropriate check-in counter, and then the appropriate gate. Similarly, the techniques may be used to navigate to specific seats in a stadium, exhibits at conventions and trade shows, classrooms in a school or university, etc.

In addition, the navigation system may be designed to interact with other services. For example, the navigation system may not only direct a user to a specific parking spot, but it may also interact with a payment system to pay for the parking spot. In some embodiments, the navigation system may be configured to pay for a parking spot even before the user arrives at the parking spot, thereby "reserving" the parking spot for the user.

As another example, the navigation system may be configured to interact with a ticketing service. In response to a user purchasing a ticket for an event, the ticketing service may send information about the venue and seat to the navigation system. When it comes time to travel to the event, the navigation system may have a control that allows the user to simply select the previously-stored event information. In response to selecting the previously-stored event information, the navigation system navigates the user to the venue using an outdoor map, and then seamlessly transitions to an indoor map of the venue and navigates the user to the particular reserved seat.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
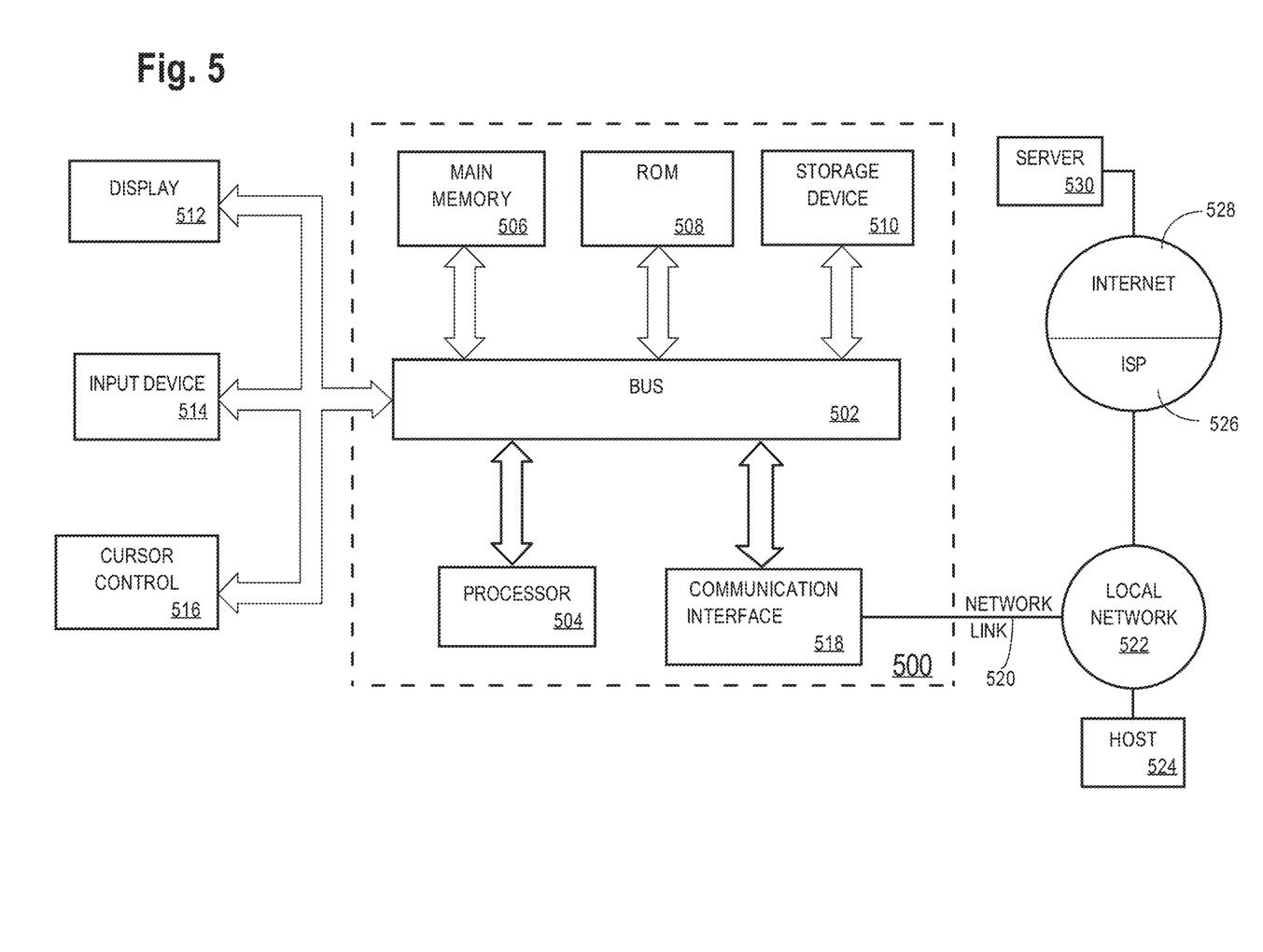
FIG. 5 is a block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of transitioning a map, the method comprising:
   determining, at a first time and based on first satellite signals, an outdoor location of a computing device;
   displaying, on the computing device, a first version of a map showing the outdoor location and including outdoor elements;
   determining, at a second time following the first time, that the computing device has moved from the outdoor location to an indoor location based on second satellite signals;
   determining that the outdoor location is proximate to an indoor parking structure;
   in response to determining that the computing device has moved to the indoor location and determining that the outdoor location is proximate to the indoor parking structure, automatically transitioning, by a processor of the computing device, the map from the first version of the map to a second version of the map, wherein the second version of the map includes internal elements of the indoor parking structure;
   receiving, from a user of the computing device, one or more criteria for selecting a destination parking location in the indoor parking structure;
   selecting, from a plurality of destination parking locations, a destination parking location based on the one or more criteria received from the user and one or more characteristics of the plurality of destination parking locations; and
   presenting indoor navigation directions for reaching the destination parking location in the indoor parking structure.

2. The method of claim 1, wherein the one or more criteria include a duration for parking a vehicle, and the one or more characteristics of the plurality of destination parking locations include a respective permissible parking duration at each parking location.

3. The method of claim 1, wherein the one or more criteria include a size of a vehicle carrying the computing device, and the one or more characteristics of the plurality of destination parking locations include a respective size of each parking location.

4. The method of claim 1, wherein the computing device receives map data for the second version of the map from a transmitter located at the indoor structure.

5. The method of claim 1, wherein the second version of the map includes a first indicator that indicates a location of the computing device in the indoor parking structure, a second indicator that indicates the destination parking location, and a suggested indoor route from the location of the computing device to the destination parking location.

6. The method of claim 1, wherein the outdoor elements include street maps.

7. The method of claim 1, wherein the second version of the map does not include at least some of the outdoor elements.

8. The method of claim 1, wherein determining that the computing device has moved from the outdoor location to the indoor location is based on signals received from a transmitter located at the indoor parking structure.

9. The method of claim 8, comprising receiving map data from the transmitter located at the indoor parking structure.

10. The method of claim 1, comprising:
    receiving, from the user of the computing device, a request to navigate to a destination store in an indoor structure;
    selecting, from the plurality of destination parking locations, the destination parking location based on distances between the plurality of destination parking locations and an entrance of the indoor structure that is closest to the destination store;
    determining, at a third time following the second time, that the computing device has moved to the entrance of the indoor structure that is closest to the destination store;
    in response to determining that the computing device has moved to the entrance of the indoor structure that is closest to the destination store, automatically transitioning, by the processor of the computing device, the map from the second version of the map to a third version of the map, wherein the third version of the map includes internal elements of the indoor structure; and
    presenting indoor navigation directions for reaching the destination store.

11. The method of claim 1, wherein the one or more criteria include a usage cost.

12. A system comprising:
one or more processors; and
a non-transitory storage device storing instructions operable to cause the one or more processors to perform operations for transitioning a map, the operations comprising:
  determining, at a first time and based on first satellite signals, an outdoor location of a computing device;
  displaying, on the computing device, a first version of a map showing the outdoor location and including outdoor elements;
  determining, at a second time following the first time, that the computing device has moved from the outdoor location to an indoor location based on second satellite signals;
  determining that the outdoor location is proximate to an indoor parking structure;
  in response to determining that the computing device has moved to the indoor location and determining that the outdoor location is proximate to the indoor parking structure, automatically transitioning, by the one or more processors, the map from the first version of the map to a second version of the map, wherein the second version of the map includes internal elements of the indoor parking structure;
  receiving, from a user of the computing device, one or more criteria for selecting a destination parking location in the indoor parking structure;
  selecting, from a plurality of destination parking locations, a destination parking location based on the one or more criteria received from the user and one or more characteristics of the plurality of destination parking locations; and
  presenting indoor navigation directions for reaching the destination parking location in the indoor parking structure.

13. The system of claim 12, wherein the one or more criteria include a duration for parking a vehicle, and the one or more characteristics of the plurality of destination parking locations include a respective permissible parking duration at each parking location.

14. The system of claim 12, wherein the one or more criteria include a size of a vehicle carrying the computing device, and the one or more characteristics of the plurality of destination parking locations include a respective size of each parking location.

15. The system of claim 12, wherein the one or more characteristics of the plurality of destination parking locations include a respective current availability of each parking location.

16. The system of claim 12, wherein the one or more characteristics of the plurality of destination parking locations include a respective size of each parking spot.

17. One or more non-transitory computer-readable media storing instructions which, when executed by one or more processors, cause performance of a method for transitioning a map, the method comprising:
  determining, at a first time and based on first satellite signals, an outdoor location of a computing device;
  displaying, on the computing device, a first version of a map showing the outdoor location and including outdoor elements;
  determining, at a second time following the first time, that the computing device has moved from the outdoor location to an indoor location based on second satellite signals;
  determining that the outdoor location is proximate to an indoor parking structure; and
  in response to determining that the computing device has moved to the indoor location and determining that the outdoor location is proximate to the indoor parking structure, automatically transitioning, by a processor of the computing device, the map from the first version of the map to a second version of the map, wherein the second version of the map includes internal elements of the indoor structure;
  receiving, from a user of the computing device, one or more criteria for selecting a destination parking location in the indoor parking structure;
  selecting, from a plurality of destination parking locations, a destination parking location based on the one or more criteria received from the user and one or more characteristics of the plurality of destination parking locations; and
  presenting indoor navigation directions for reaching the destination parking location in the indoor parking structure.

18. The one or more non-transitory computer-readable media of claim 17, wherein the one or more criteria include a duration for parking a vehicle, and the one or more characteristics of the plurality of destination parking locations include a respective permissible parking duration at each parking location.

19. The one or more non-transitory computer-readable media of claim 17, comprising selecting the destination parking location from the plurality of destination parking locations by comparing the one or more characteristics of the plurality of destination parking locations to the one or more criteria.

20. The one or more non-transitory computer-readable media of claim 17, wherein the one or more criteria include a size of a vehicle carrying the computing device, and the one or more characteristics of the plurality of destination parking locations include a respective size of each parking location.

21. The one or more non-transitory computer-readable media of claim 17, wherein the second version of the map includes a first indicator that indicates a location of the computing device in the indoor parking structure, a second indicator that indicates the destination parking location, and a suggested indoor route from the location of the computing device to the destination parking location.

* * * * *